United States Patent [19]

Pivar

[11] 4,336,964
[45] Jun. 29, 1982

[54] LIGHTWEIGHT CANOPY FOR THREE-WHEELED VEHICLE WITH LOW CENTER OF GRAVITY

[75] Inventor: Stuart Pivar, New York, N.Y.

[73] Assignee: American Microcar Incorporated, Farmingdale, N.Y.

[21] Appl. No.: 131,165

[22] Filed: Mar. 17, 1980

Related U.S. Application Data

[63] Continuation of Ser. No. 111,199, Jan. 11, 1980, which is a continuation-in-part of Ser. No. 963,282, Nov. 24, 1978, Pat. No. 4,237,995.

[51] Int. Cl.³ .......................... B60J 7/10; B62J 17/00
[52] U.S. Cl. .................................. 296/78 R; 180/210; 280/289 S; 296/78.1
[58] Field of Search ..................... 180/210, 215; 280/289 S; 296/78 R, 78.1, 190

[56] References Cited

U.S. PATENT DOCUMENTS

| 2,682,427 | 6/1954 | Bright | 296/78 R |
| 3,284,130 | 11/1966 | Michael | 296/78.1 |
| 3,709,553 | 1/1973 | Churchill et al. | 296/78 R |
| 3,829,152 | 8/1974 | Hobbs | 296/78 R |
| 4,020,914 | 5/1977 | Trautwein | 180/210 |

FOREIGN PATENT DOCUMENTS

1142921  7/1957  France ........................ 296/78.1

Primary Examiner—Joseph F. Peters, Jr.
Assistant Examiner—Donn McGiehan

[57] ABSTRACT

A lightweight canopy is provided for sheltering passengers in a three-wheeled vehicle. The canopy is built of spaced and tubular frame parts of inverted generally U-shaped configuration with transverse connecting members connecting the extremities of these parts so that the U-shaped parts include bight portions resiliently deflectable towards each other. Cover portions are mounted under tension between the bight portions due to the resilient deflection of the latter. A transparent windshield is connected between front posts in the aforesaid canopy with horizontal tubes extending rearwardly from these front posts to define door frames with the tubular frame parts. Doors are hingeably connected to the front posts by hinge clips. A number of auxiliary features are provided in the form of struts over which portions of the doors may be folded in order to form window openings and by the use of Velcro connecting means whereby the parts may be releasably connected to the framework of the canopy in readily mountable and demountable manner without adding substantial weight to the superstructure of the vehicle.

10 Claims, 12 Drawing Figures

LIGHTWEIGHT CANOPY FOR THREE-WHEELED VEHICLE WITH LOW CENTER OF GRAVITY

OTHER APPLICATIONS

This application is a continuation application based on my copending application Ser. No. 111,199, filed Jan. 11, 1980 which is a continuation-in-part application of application Ser. No. 963,282, filed Nov. 24, 1978, now U.S. Pat. No. 4,237,995.

FIELD OF INVENTION

This invention relates to superstructures for three-wheeled vehicles and the like and more particularly to vehicles provided with a low center of gravity so as to facilitate appropriate positioning of drivers and passengers and particularly to canopies for vehicles having lightweight superstructures which provide shelter without materially affecting the center of gravity.

BACKGROUND

As described in copending application Ser. No. 111,199 three-wheeled vehicles have long been used for automotive transportation. Their use has been limited because of the problem of instability, for which reason four-wheeled vehicles have become prevalent.

Certain specialized three-wheeled vehicles are used today such as golf carts and delivery and other small utility vehicles, as well as three-wheeled motorcycles used as sport vehicles. To increase stability, these vehicles are generally built with a low center of gravity. This is accomplished by the use of small wheels and the placement of passenger seating in a relatively low position.

In the United States, Federal and local laws place minimums on the diameter of wheels and on the distance of the seat from the ground. This limits the degree of stability possible in the design of three-wheeled vehicles. As a result, many commercially made three-wheeled automobile vehicles manufactured in this country and in others are not legally usable on roads in the U.S. Although many of these are made in and used in Europe, they are not imported into the U.S. Those made here are relegated to "off road" use, or use by governmental agencies, such as police, which are permitted to use vehicles which do not conform to these regulations. Three-wheeled motorcycles are generally used by experienced sport motorcycle drivers rather than the average citizen.

Three-wheeled automotive vehicles pose an additional problem owing to their small size relative to the size of the other cars on the roads they share. This is that the driver and passengers do not feel safe or confident unless they are seated relatively high off the road. To be seated low in traffic consisting of conventional cars results in an insecure feeling, deriving most likely from lack of visibility on the part of the driver and the knowledge that he is not conspicuous to other drivers. The achievement of stability in three-wheeled vehicles by the use of low seating and/or small wheels is limited by the regulatory laws mentioned above and by the need for the feeling of height on the part of the passengers and driver.

The need to provide a covering for the passengers as protection against the weather complicates the problem as a structure above the heads of the passengers will tend to elevate the center of gravity by adding weight at a relatively high point.

The use of electric storage batteries introduces a further problem, that of providing sufficient energy storage capacity to offer enough range of driving between recharges of the batteries commensurate with practical needs. Numerous electric vehicles exist today. They consist of full-sized, four-wheeled electric automobiles weighing thousands of pounds, as well as smaller three-wheeled vehicles used as off-road utility vehicles of golf carts. Even these tend to weigh upward of several thousand pounds. None of these vehicles are for general road travel and regular transportation due to their general impracticality concerning range, cost, utility, and stability. These problems arise from the need to supply energy storage capacity sufficient to move the weight of the vehicle and its load by means of electric storage batteries which themselves are so heavy as to contribute substantially to the load. They also require heavier chassis construction merely to support them.

French Pat. No. 1,142,921 and the Michael U.S. Pat. No. 3,284,130 show windshields with the Michael patent further showing what might be regarded as constituting a canopy. Specifically, the Michael patent discloses a windshield and spray shield construction which comprises an upright windshield frame with devices securing the frame to an upper portion of the front end of the main frame of a motorcycle. The construction also includes devices defining a pair of support arms projecting rearwardly and downwardly from opposite side portions of the lower end portion of the windshield frame. The main frame of the motorcycle includes forwardly and upwardly inclined forward portions from whose upper end the front wheel assembly is pivotably supported. An upstanding flexible spray shield is secured between the aforesaid arms and is passed over the forwardly and upwardly inclined portion of the main frame. The support arms generally parallel the forwardly and upwardly inclined portion of the main frame and are disposed forwardly of the upwardly inclined position.

The prior art fails to reveal a three-wheeled lightweight vehicle with an advantageously positioned center of gravity as is provided in accordance with the invention and as will be discussed in greater detail hereinafter.

SUMMARY OF INVENTION

It is an object of the invention to provide an improved lightweight vehicle.

It is another object of the invention to provide an improved weight distribution in three-wheeled vehicles and the like whereby passengers and drivers thereof may readily perceive surrounding situations such as traffic and hazards and the like for purposes of improved safety.

Still another object of the invention has to do with the provision of a lightweight improved structure constituting a canopy for purposes of providing shelter for drivers and passengers without substantially affecting the advantageous location of the center of gravity of the associated vehicle.

In accordance with copending application Ser. No. 111,199, there is provided a vehicle comprising frame means adapted to support at least one passenger (or driver), a source of power, three wheels on and supporting said frame means for ground traversing movement, and an electric motor coupled to and driving at least one of said wheels and being coupled to and driven by said source of power, said source of power being located relatively low in said vehicle and constituting a substantial portion of the weight of the vehicle whereby to define for the vehicle a relatively low center of gravity.

In accordance with said copending application, the center of gravity with the vehicle unloaded is no more than about 13 inches above the ground, or, in other words, is in the approximate vicinity of the height of the vehicle supporting wheel axles relative to the height thereof. Moreover, passenger seating is provided at a height of about 26–32 inches above the ground, the center of gravity with the vehicle carrying a passenger load of about 400 pounds being no more than about 28 inches above the ground.

In accordance with a further feature of said copending application, the source of power of the vehicle includes a battery pack constituting at least about one-third of the weight of the unloaded vehicle, and being so positioned that the center of gravity is located in accordance with the aforegoing discussion thereof. The battery pack may include one or two and possibly more lead-acid storage batteries with the total weight of the battery pack being, for example, about 110 pounds plus or minus 30 pounds.

As has been indicated hereinabove, the invention features a lightweight canopy including a framework of hollow tubing and plastic sheeting on this framework to provide an enclosure for the passengers.

The invention accordingly relates to the provision of a lightweight superstructure or canopy for the sheltering of passengers inclusive of the vehicle driver. As will be seen, the canopy of the invention comprises according to a preferred embodiment thereof spaced and parallel tubular frame parts of inverted generally U-shaped configuration, transverse connecting members connecting extremities of these parts such that the U-shaped parts include bight portions resiliently deflectable towards each other, and at least one flexible cover portion mounted under tension between said bight portions.

According to various features of the lightweight superstructure of the invention, the parts include front and rear posts inclusive of the aforesaid extremities and there is provided a transparent windshield extending between and connected to the front posts. Additionally, horizontal tubes are provided which extend rearwardly from the extremities of the front posts to define door frames therewith. Doors are provided in the door frames, each said door including a generally polylateral frame and a flexible transparent sheet on and closing the polylateral frame. Hinge means are provided on the polylateral frames and are employed to detachably couple the doors to the front posts.

According to still a further feature of the invention, tusk-like members are provided for attaching the canopy to the vehicle in the manner of a clamping jaw. Moreover, struts are provided which extend across the doors to brace the transparent sheets thereof. It will be noted that the struts are positioned approximately midway relative to the height of the door, and the transparent sheets of the door are foldable over the same to form window openings.

According to still other aspects of the invention, the windshield is provided with an upper edge and first Velcro means are provided on and extending along the upper edge with second Velcro means being provided on the cover portion for lockingly engaging the first said Velcro means.

According to yet a further feature of the invention, a canopy apron is positioned below the windshield with Velcro strips being provided on the apron to hold the same removably on the aforesaid front posts. The canopy apron will be provided preferably with a vertical downwardly open slot to accommodate the steering column of the vehicle.

The above and other objects, features, and advantages of the invention will become apparent in the detailed description of a preferred embodiment which follows hereinbelow and which will be illustrated in the accompanying drawing.

DETAILED DESCRIPTION

In copending application Ser. No. 111,199, there is provided a vehicle which seats two passengers side by side at a height of about 26 inches above the road with sufficient stability for ordinary driving, powered by electric storage batteries which provide a driving range of, for example, 30–50 miles at 20 miles per hour. The vehicle weighs, for example, 300 pounds including the batteries.

In addition to the above-stated practicality of the vehicle, its small size and low weight result in extreme efficiency of use and the possibility of a low cost of manufacture. Another advantage is that the manufacturing process itself consumes relatively little energy. Expensive or scarce raw materials are used at a minimum. The invention has a special practicality and social value in a society of low energy availability.

The vehicle of the invention is a tricycle-like automobile with, as mentioned previously, seating for two passengers, side by side. The seat is placed about 26 inches above the road bed. The eye level of the driver is thereby elevated above the roof of other cars on the road and the driver will sense a feeling of conspicuousness. The passenger feels safe for similar reasons.

It has been found that a high degree of stability can be achieved in a small three-wheeled vehicle by arrangement of heavy weight components such as batteries and motor, which are slung underneath the chassis. Even in the case of a vehicle with a protective covering structure, sufficient stability has been found to be gained thereby as to permit, for example, a ninety degree turn at 16 mph of 47 feet radius with two passengers aboard such that the inboard wheel does not lift off the ground due to centrifugal force.

As will be shown and discussed relative to the drawing, the center of gravity of the vehicle is at a point 15–18 inches above the ground with two heavy people therein (e.g., about 200 pounds each). This is due to the low disposition of the of the two lead-acid storage batteries which are used and which have a combined weight of 100 pounds, and of the electric motor which weighs about 20 pounds. The curb center of gravity (with no passengers) is about 13 inches above the ground. The same vehicle powered by an internal combustion engine weighing 30 pounds has a center of gravity 18 inches above the ground. This vehicle can perform the above-mentioned turn at 13 miles per hour.

The stability problem of the three-wheeled vehicle is compounded in case the same vehicle is intended for use by one or two people, especially if they are seated side by side, as this shifts the load. With two people aboard, the weight load is distributed relatively symmetrically about the longitudinal axis of the vehicle. However, the steering apparatus must be conveniently available to the driver who sits generally on the left. If there is no passenger, the driver gains better stability by sitting in the middle of the seat thus restoring symmetrical weight disposition. However, he must still have convenient access to the steering apparatus. It has been found that the type of steering column described below uniquely provides convenient access regardless of whether the driver is sitting to the left or in the middle. More specifically, the steering column with handles and controls is placed in a position halfway between the extremes of the lefthand position and the middle position. Although this placement is not ideal for either of the two seating positions, it uniquely makes the difference in displacement in both cases sufficiently small so as to prevent inconvenience to the driver and to contribute synergistically to the balance. Thus, the driver is given the additional choice when driving alone of placing himself in a position halfway between left and center and thereby directly behind the steering post. In this position, the stability of the vehicle is sufficient to make the above-described ninety degree turn at the prescribed speed with the same result; that is, the inboard wheel does not lift during the turn. When sitting to the left in such a turn, the driver tends instinctively to shift the weight of his body to the right in response to an instinct to maintain stability. The need for this uncomfortable movement is substantially obviated when he sits closer to the middle, a position made possible by the offset placement of the steering apparatus.

The vehicle of the invention can, moreover, be provided with a canopy like covering to serve as protection from the weather. A problem which might be created by the use of a canopy is the strong effect upon the center of gravity of such a structure located at a high point on the vehicle. The canopy, provided in accordance with the present invention, consists of a framework comprising of a pair of structures made of bent, lightweight steel tubing. The structures are separated by elements perpendicular thereto, which serve to space them and attach them to each other so that they form a framework to support a windshield in the front of the vehicle as well as a sheet of clear, thin gauge flexible plastic material which is attached to this frame in a manner which tends to stretch it taut so as to provide a pleasing appearance as well as good optical properties. It is found that polyvinyl chloride of thickness ranging from 0.006" to 0.010" has the correct flexibility to maintain a proper taut configuration during the driving of the vehicle so as to avoid slack which would result in flapping and poor visibility as well as ultimate wear. Tautness is maintained by a combination of the flexibility of the tubing and that of the plastic sheet. When installed on the frame, one side of the tubing is caused to bend toward the other during the attachment, and held in that position until released when the vinyl is attached. In this way, the tension, resulting as the tubing seeks to regain its normal, unbent position, places continuous tension on the vinyl in a lateral direction.

The attachment of the vinyl is done by means of "Velcro" which makes an attachment which can be accomplished quickly using no special attachment devices or contrivances other than its own structural connection which can as well be undone quickly. The vinyl wraps around the tubing and the two parts of the Velcro system conventionally attach to each other in such a way that the tubing is protected from the elements and the visual effect reacted by the Velcro strips constitutes a pleasing decorating effect.

The natural flexibility of the structure is used to attach the canopy to the vehicle. The ends of both sides of the canopy are disposed inwardly in such a way as to enter sockets which are attached to the frame of the vehicle. The terminal ends of the canopy can be stretched apart from each other so that clearance is caused for the ends to enter the sockets. Upon being placed in a position opposite each socket, stretching tension is released and the natural tendency of the tubing to regain its form causes it to enter the sockets. By this means of attachment, a person of little mechanical ability can attach or detach the canopy with the use of no tools or special attachment devices whatsoever in a short period of time. In this way, the vehicle is converted from an open vehicle to one bearing a weather-protecting enclosure.

It has been found that a canopy such as described above retains its shape and mechanical integrity in ordinary driving use despite the tension placed on it by wind and by vibration resulting from travel on ordinary roads when the framework is constructed of steel tubing ranging from ⅜ to ½ inches in diameter with a wall thickness of 18 through 14 gauge. These diameters and wall thicknesses moreover provide flexibility of the correct degree to allow for deforming during the process of installing the vinyl top and during attachment of the frame to the vehicle and for the return after these installation procedures to original form. The canopy weighs only about 26 pounds and thereby is responsible for the raising of the center of gravity by only 6–7 inches together with the load.

Provisions are further made upon the canopy frame for the attachment and detachment of hinged side panels acting as doors to protect the passengers from weather conditions. These consist of frames made of bent lightweight steel tubing ⅜ inches in diameter upon which is attached clear polyvinyl chloride sheet material of 0.006"–0.010". These are attached by means of a pair of attached downwardly disposed steel hingepins which enter a corresponding pair of steel tube sections which are attached to the doors of the vehicle. These panels or doors create a relatively exact fit with the frame. It has been discovered that these panels provide protection to passengers against rain and cold despite a possibly inexact fit as air does not tend to enter the interstices thereby formed while the vehicle is in motion, due to the effect of the currents of air streaming around the vehicle while it is in motion. This tends to create a negative pressure around these interstices which tends to prevent the air from entering. This permits the use of a very light construction of door panels which, although possibly incapable of a tight seal, are nonetheless effective for the reasons above mentioned. There are, moreover, of extremely light weight, being only about seven pounds each.

The vehicle of the invention can be equipped with a pair of attachable flaps of clear PVC. These are attached behind the door panels, where they create a loose fit offering additional protection against the weather. It has been found that, when the vehicle is equipped with the above-mentioned panels and flaps, the passenger is kept sufficiently warm as to be comfortable enough on a relatively cold day without the use of supplementary heat. This effect is caused by the insulating effect of the stillness of the air within the enclosure formed by the canopy and the side panels. The enclosure being relatively small with respect to the size of the occupants, the body heat is retained within in an amount sufficient to create an atmosphere of comfort. The entry of direct sunlight has the tendency to enable the entrapment of radiant heat by means of the so-called greenhouse effect which is heightened by the transparency of the canopy top and the side panels which permit the passage of heat in the form of infrared radiation. In the absence of these heating effects, the use of a supplementary electric heater would substantially reduce the energy efficiency of the vehicle thereby reducing its range.

FIGS. 1-6 illustrate an electrically propelled three-wheeled vehicle provided in accordance with copending application Ser. No. 111,199. In these figures, the vehicle is indicated generally at 10, and it will be seen that the vehicle includes a front wheel 12 and two rear wheels 14 and 16, these wheels are of the same size and have a diameter of, for example, 20 inches. The tires on these wheels are conventional air-inflated tires fabricated of rubber or the like, but the nature and size of the tires is not particularly limiting of the invention disclosed herein. It will be noted that the tires are mounted on rims 20 held by spokes 22 on a central hub 24, each tire having an axis of rotation such as generally indicated at 26.

It will be noted that the front tire is provided with a mud guard 28 and that the front tire is straddled by a yoke 30 constituting part of a steering column 32 bearing a headlight 34. The steering column has connected thereto a steering rod 35 having mounted thereon handles 36 and 38, the positions of which will be described in greater detail hereinbelow.

A chassis is provided for the vehicle consisting in part of horizontal tubes such as indicated at 40. The source of power of the vehicle is indicated at 42 and is constituted, for example, by a battery pack which is suspended below the chassis. The relatively low positioning of the battery pack constitutes a feature of the invention in conjunction with other weight distribution as will become more apparent hereinafter. It will be noted that the battery pack may be constituted by way of example of two lead-acid storage batteries, each capable of providing 12 volts. It will also be noted that these batteries will be of the rechargeable type with appropriate provision being made for recharging the same with an anticipated charge use of, for example, 25 to 50 miles range being anticipated. The capacity of the batteries is, however, not a limiting feature of the invention as the state of the art with respect to such batteries may be rapidly developing during the course of the life of this patent. Mounted adjacent the power pack 42 is a DC electric motor 44 which converts the power of the battery pack 42 into rotary power. This power is transmitted to the shaft of wheel 16 by means of a chain 46 connected to a sprocket 48 (FIG. 6) in conventional manner. As will be seen hereinafter, a rotary switch provided on handle 36 permits selectively connecting one or both of the batteries in power pack 42 to the motor 44 thereby altering the speed at which the vehicle can be driven. As will also be seen, this rotary switch operates in conjunction with hand brake levers 59 and 52 which function through respective cables to apply mechanical braking system to the front wheel 12 and the rear wheel 14.

Figure 1:
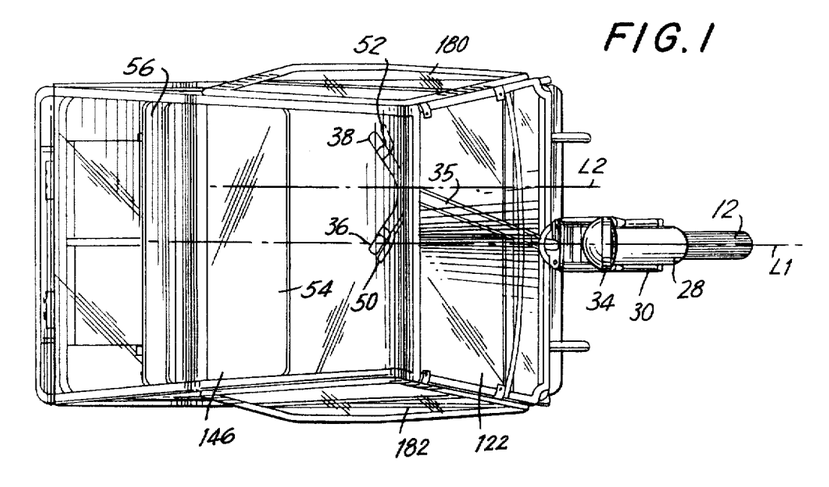
FIG. 1 is a top view of a three-wheeled vehicle provided in accordance with the invention.

Mounted above the rear wheels 14 and 16 is a seat 54 having a back 56 associated therewith. The seat 54, as can be best viewed in FIG. 1, is of a width which is adapted to accommodate at least two passengers inclusive of the driver. The top of the seat 54 is a distance D1 above the ground, the distance D1 preferably being in the order of about 26 inches above the ground, thereby affording to the driver and passengers substantially unlimited vision while at the same time affording to the driver and passengers an extreme sense of security and of being conspicuous to drivers in surrounding vehicles so that a tremendous sense of safety is afforded.

Hereinabove reference has been made to the weight of the battery pack 42 and to the fact that the curb center of gravity (i.e., with no passengers) of the vehicle 10 is about 13 inches above the ground. With two passengers in the vehicle of fairly large magnitude of weight, there will be added to the vehicle a load of approximately 400 pounds. This means that the center of gravity will be somewhat raised. However, the center of gravity is not raised beyond a limit of about 28 inches above the ground thereby maintaining the type of stability deemed necessary in accordance with this invention. Consequently, as will be referred to hereinafter, the vehicle is capable of making turns of relatively small radii at relatively high speeds without any of the wheels of the vehicle lifting off the ground.

The vehicle of the invention is furthermore provided with a relatively lightweight superstructure or canopy such as generally indicated at 60. The lightweight superstructure is fabricated of hollow tubing and plastic sheeting or the like, thereby contributing only a minimal amount to the weight of the vehicle. Accordingly, the weight of the passengers is a major contributing factor to the displacement of the center of gravity aside from the influence afforded by the particularly advantageous inclusion of the power pack 42 and the weight thereof.

In the preferred embodiment of the invention, the unloaded vehicle may weigh, for example, 300 pounds including the batteries. The batteries will weigh in the vicinity of 100 to 110 pounds, thereby constituting approximately one-third of the weight of the unloaded vehicle. When the vehicle is loaded with two substantially large passengers, approximately 400 pounds will be added to the weight, thereby making an aggregate weight of approximately 700 pounds. This weight is appropriately distributed as has been noted hereinabove to maintain the center of gravity relatively low while combining therewith the particularly advantageous disposition of the passengers to achieve the benefits which have been discussed. Thus, in accordance with the invention, the battery pack is suspended under the floor board of the vehicle so that this will lower the center of gravity of the vehicle by an amount substantially more than would be achieved in gasoline-powered vehicles. This is explained by the difference in weight between the gasoline engine and the battery pack and electric drive motor 42. A gasoline engine adequate for driving a vehicle of the noted type weighs approximately 25 pounds. On the other hand, an electric motor weighs 25 pounds, with the battery pack weighing approximately 100 to 110 pounds. Thus, the use of the battery not only provides a desirable substitute for a fuel-consuming engine, but, in addition, it adds a net weight of approximately 100 pounds to the structure whose center of gravity is then roughly 13 inches from the ground. Simple mathematical calculations based on centrifugal force will show that for any given maneuver, such as turning, there will be more stability with the electrical vehicle described above than with the gasoline-powered vehicle.

The amount of stability, of course, varies with the weight of the passengers, but, in any case, the electrical vehicle will be more stable than the gasoline-powered vehicle, especially if the batteries are moved to the rear as will be discussed hereinafter.

The battery placement affords further benefits by having an effect on steering under dynamic road conditions when the vehicle is being turned to the left or to the right. Appropriate battery placement induces little or no side loads on the front wheel which is usually a problem on three-welded vehicles. It has been found that with the batteries placed midway between the front and rear wheels, the side loads on the front wheel are somewhat higher with a resulting scrubbing of the front tire when the vehicle is maneuvered supply to the left or right. Judicious positioning of the battery pack even further toward the rear avoids this unexpected problem as will be shown.

As mentioned hereinabove, when two passengers are seated side by side, the weight load is distributed relatively symmetrically about the longitudinal axis of the vehicle. This longitudinal axis is indicated in FIG. 1 at L1. However, if there is no passenger, the driver can gain improved stability by sitting in the middle of the seat, thus again achieving symmetrical weight distribution. However, he still must have convenient access to the steering apparatus. With this goal in mind, it has been found that a particular type of steering column uniquely provides convenient access regardless of whether the driver is sitting to the left as when he is accompanied by a passenger or in the middle where, for example, he may position himself when he is driving alone.

There is indicated at L2 in FIG. 1 a second longitudinal axis which is parallel to but spaced from the longitudinal axis L1. The axis L2 constitutes the axis of symmetry for handles 36 and 38 of the steering apparatus of the invention. Longitudinal axis L2 is positioned substantially midway between the planes of the wheel 12 and the wheel 16 of the vehicle, or, in other words, approximately midway between left and central planes of the vehicle and such that the driver may have appropriate access to the steering apparatus whether he is driving by himself and positioned closer to the central longitudinal axis of the vehicle.

Figure 2:
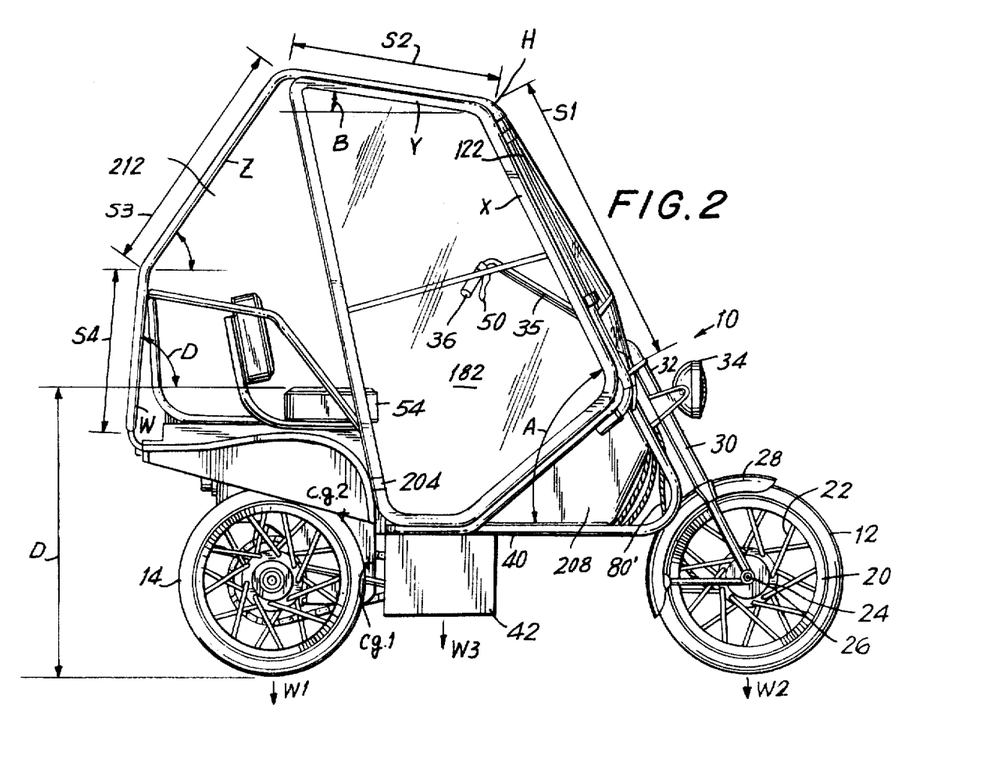
FIG. 2 is a side view of the vehicle of FIG. 1.
Figure 3:
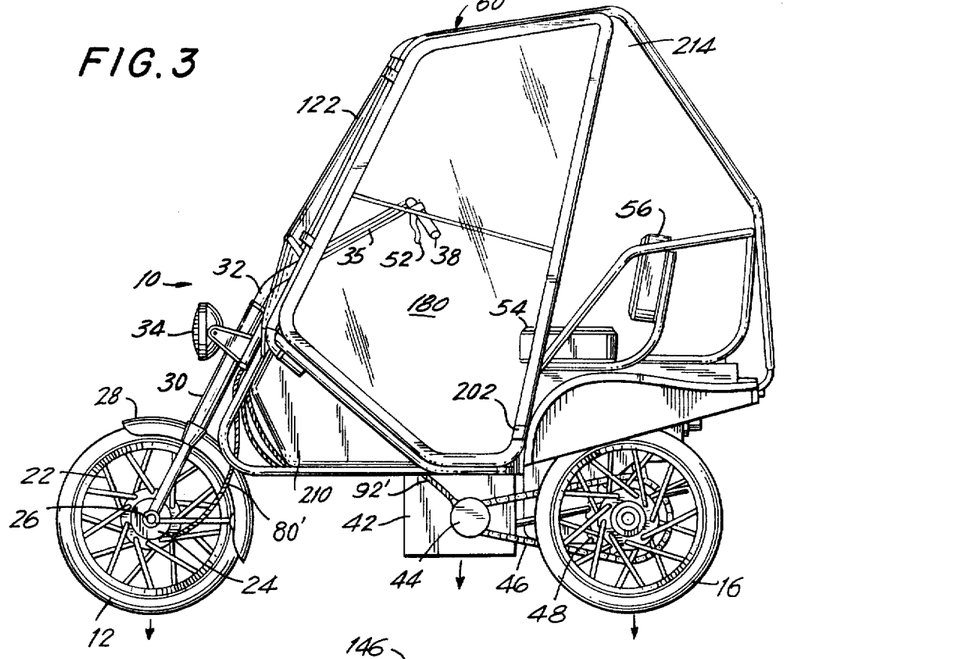
FIG. 3 is a side view of the vehicle of the invention taken from the side opposite to that illustrated in FIG. 3.

FIGS. 2 and 3 illustrate weight distribution in the embodiment illustrated in FIGS. 1–6. Assuming the weights which have been mentioned hereinabove and that the weight of the vehicle will be in the vicinity of 300 pounds, the weight distribution will be such that W1 will equal approximately 170 to 200 pounds whereas the weight supported as indicated at W2 will be approximately 100 to 130 pounds. The weight W3 indicated at the battery pack 22 in FIGS. 2 and 3 will run approximately 100 to 120 pounds. This weight distribution has been found eminently satisfactory to achieve the various benefits noted hereinabove with respect to vehicles of the invention.

A lightweight canopy structure of the invention is illustrated in FIGS. 7–12. Herein can be seen two U-shaped tubular members 102 and 104, having the extremities thereof connected by transverse members 106 and 108. Inverted U-shaped members 102 and 104 constitute jaws which include bight portions 110 and 112 and which tend yieldably to retain their illustrated shapes. To permit mounting the canopy on the vehicle, the jaws are forced open and then released and fit into sockets on the chassis.

Figures 7, 8, 9, 10, 11, 12:
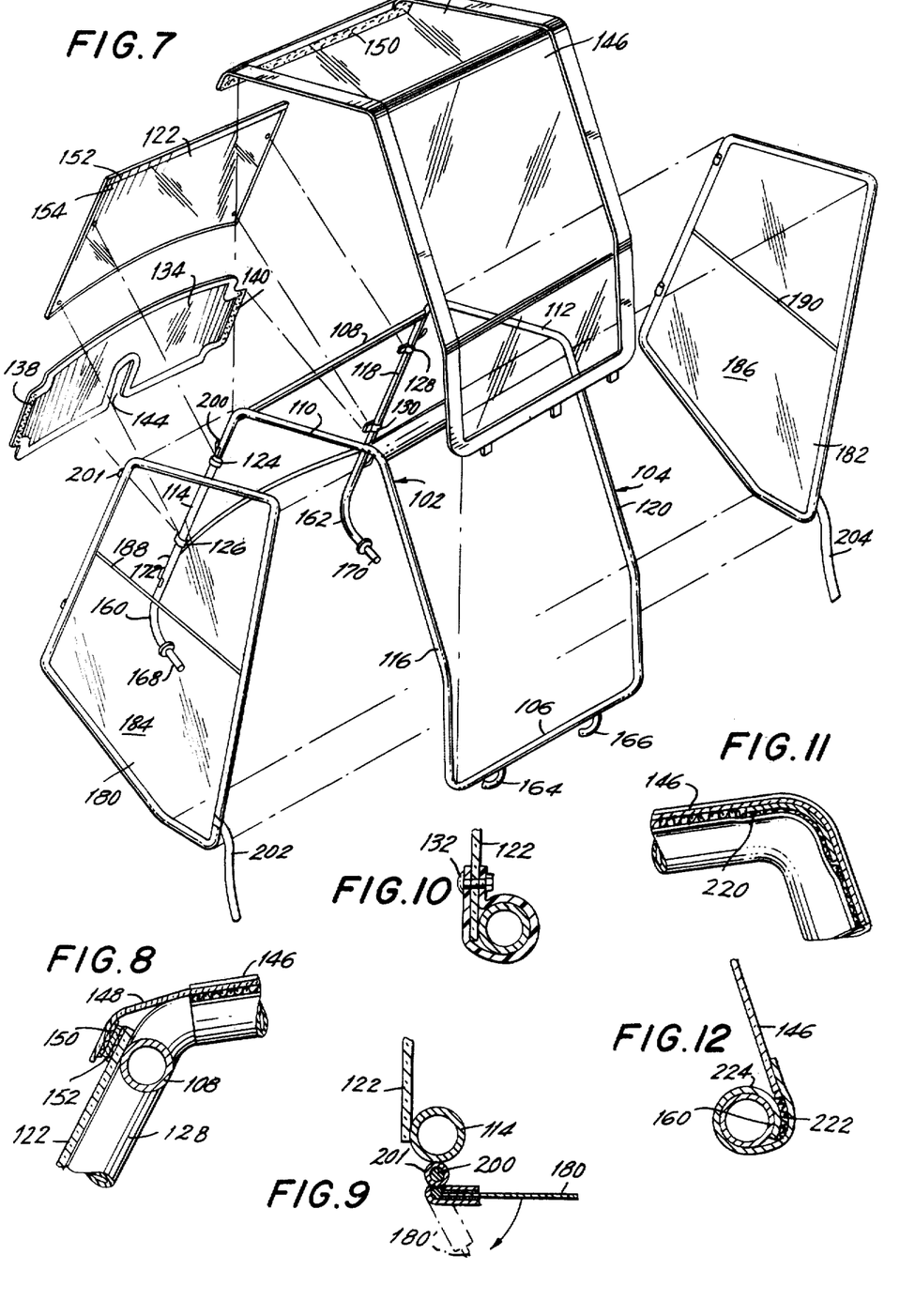
FIG. 7 is an exploded view of the lightweight canopy employed in the vehicle of the invention.
FIGS. 8, 9, 10, 11, and 12 illustrate cross-sectional details in the connecting of the various parts illustrated in FIG. 7.

U-shaped member 102 includes a front post 114 and a rear post 116. U-shaped member 104 includes a front post 118 and a rear post 120. These members are fabricated of tubular extrusions or of tubular steel of a size which has been indicated hereinabove. The bights 110 and 112 are resiliently deflectable towards one another so that upon a mounting of a plastic sheet thereon, the plastic sheet is upon release of the tubular bights placed under a tension so as to provide minimum optical distortion.

It will be noted that the canopy is provided with a windshield 122 formed of plexiglas or a suitable plastic which provides minimum optical distortion and is minimally susceptible to abrasion. This windshield 122 is mounted on the front post 114 and 118 by means of brackets 124, 126, 128, and 130. FIG. 10 shows that the mounting takes place by means of bolts 132 so that the windshield is settled rigorously in position.

Below the windshield may be optionally mounted a canopy apron 134. The canopy apron 134 is of either transparent or opaque material and is preferably of a suitable plastic such as PVC. The apron 134 may, for example, be provided with Velcro edge strips 138 and 140 by means of which the apron is detachably mounted on the front post 114 and 118 which are provided with matching strips (not shown). It will be further noted that the canopy 134 is provided with a vertically downwardly opening slot 144, the purpose of which is to accommodate the steering column of the vehicle. Thus, the apron 134 may be mounted in position or deliberately omitted when it is desired to optimize the ventilation characteristics of the vehicle.

A canopy top is indicated at 146. This canopy top is preferably fabricated of PVC or the like and is of a sheet material whose thickness, for example, may be in the order of 0.006 to 0.010 inches. As has been noted hereinabove, this member is placed under by the resilient deflection of the bight portions 110 and 112, thereby affording minimal optical obscurity. It will be noted that at the front portion 148 of the canopy top there is mounted a transverse Velcro strip indicated at 150. This Velcro strip is intended to cooperate in locking fashion with the corresponding Velcro strip 152 at the upper edge 154 of the windshield 122. The connection is best seen in FIG. 14 wherein appears canopy top 146 and Velcro strips 150 and 152. The plexiglas windshield is indicated at 122 as is the front post 128.

Extending downwardly from transverse member 108 are tusk-like members 160 and 162, the purpose of which is to provide for attachment of the lightweight superstructure to the chassis of the vehicle of the invention. Tusk-like members 164 and 166 extend downwardly from transverse member 106 of the canopy framework. These tusk-like members also provide for connection of the canopy to the vehicle proper in connection with the closing of the jaws as mentioned above.

Horizontal members 168 and 170 extend rearwardly from members 160 and 162 and thus from the lower extremities 172 and 174 of the front posts 114 and 118. These horizontal members 168 and 170 form with the U-shaped members door frames in which are accommodated doors indicated generally at 180 and 182. The doors 180 and 182 are provided with a framing constituted either by tubing or by a lightweight metal framing. Supported on this tubing or framing is a transparent plastic indicated, for example, at 184 and 186, these being braced by means of a strut 188 or a strut 190 respectively. These struts are fabricated of a lightweight metal such as aluminum or thin steel and constitute hand grips for engaging the doors for opening and closing of the same. It should be noted that the plastic sheets 184 and 186 are detachably connected onto the associated tubing or framing by means of Velcro tabs or Velcro grippers or the like. This permits a detaching of the upper halves of the sheets 184 and 186 for folding over struts 188 and 190 thereby to form in the doors upper window openings constituting the upper halves of the respective doors.

The doors are connected to the front posts 114 and 118 by means of hinge pins indicated in FIG. 9 generally at 200 received in hinge pockets 201. Also visible in FIG. 9 is the windshield 122 and, for example, door 180; the hinge pin 200 engages socket 201 on front post 114 for rotary movement thereabout to provide for movement of the door 180 from the closed position shown in solid lines to the open position shown at 180' in dotted lines. As has been mentioned hereinabove, the framing of the doors may be of tubing or channeled material or the like in which the plastic of the door is retained and which imparts to the plastic sheeting of the door appropriate strength for configuration maintenance.

Tabs 202 and 204 are provided on the doors 180 and 182. These tabs are adequate for maintaining the doors closed in the various usages to which the invention will be applied.

Referring again briefly to FIGS. 2 and 3, it will be seen that complementary side portions 208 and 210, which may be fabricated of metal or plastic sheeting or the like, cooperate with the doors to define further sections of the vehicle sides. Similarly, it will be seen that the rear portions of the vehicle at the sides thereof may be provided with sections 212 and 214 fabricated of plastic sheeting to constitute extensions of the door surfaces. It will also be noted that the U-shaped bights 110 and 112 of the framework of the canopy are also connected by a reinforcing plate 220. This reinforcing is further illustrated in FIG. 11 whereover rests the sheeting 146. FIG. 12 illustrates the sheeting 146 coupled to transverse member 160 either by a Velcro connection indicated at 222 or by a metal clamping indicated at 224.

While many of the features of the invention have been described hereinabove, these remain to be disucussed some very important features of the invention having to do with the construction and arrangement of the parts as well as the mentioning of the various sections of the vehicle in order to obtain particularly improved results. Thus, for example, it will be noted that the framework in profile is divided into a plurality of sections indicated generally at X, Y, Z, and W. These particular sections have a synergistic relationship to each other and with the operation of the vehicle. Particularly, it will be noted that the front portion or section X is arranged at an angle A to the horizontal to make the portion X more nearly vertical than horizontal, whereas the section Y is arranged at an angle B to the horizontal which makes the same more nearly horizontal than vertical. Sections X and Y are generally to be considered as hingeably connected to one another. The vertical disposition of section X is selected in order to minimize the visual distortion which may occur due to the nature of the windshield and plastic employed to cover this part of the framework. Moreover, this arrangement functions to allow displacement of the hinge connection H from a position generally in front of the center of gravity c.g.1 (and likewise the center of gravity c.g.2) to a position which is still in front of the center of gravity but which is rearward of the position indicated. This change of position of the hinge H is effected when the vehicle is moving and is due to the wind resistance thereof. At the same time, the section Y is influenced by the wind resistance to force the same downwardly in a direction to produce a force which substantially passes adjacent the aforesaid centers of gravity. It will be noted that the center of gravity c.g.1 is that center of gravity known as the curb center of gravity which has been discussed hereinabove for the unloaded vehicle. Center of gravity c.g.2 is the center of gravity for the vehicle when it is loaded. The force exerted by wind resistance on hinged top section Y of the framework of the vehicle operates to engage the wheels and particularly the rearmost wheels 14 and 16 of the vehicle more intimately with the ground traversed, thereby causing a much more effective traction to be generated for the vehicle and cancelling out slippage which would otherwise be the case if the load were to be lightened or in the absence of a wind resistance force.

Section W, which is one of the rear sections, is formed at an angle C which is less than the angle D of the section W. The purpose thereof is to permit an absorbing of the bending of the sections X and Y and to permit a bowing of these sections in order to absorb the effects of wind resistant forces. Specifically, the angles are as follows:

| Angle A | 64° ± 10% |
| Angle B | 8° ± 10% |
| Angle C | 54° ± 10% |
| Angle D | 94° ± 10% |

The length of the different sections are shown by way of example in the following table:

| X | Distance S 1 | = | 42 inches |
| Y | Distance S 2 | = | 24 inches |
| Z | Distance S 3 | = | 26 inches |
| W | Distance S 4 | = | 18 inches |

The above dimensions taken in conjunction with the width of the vehicle canopy, which may be taken generally as 35 inches or approximately one yard, operates to enable a greenhouse effect to be achieved. In other words, for the volume of space which is sheltered by the canopy, there is sufficient area of transparent plastic to enable the temperature therewithin to be maintained at a relatively comfortable level despite the possibility of operation in cold and inclement weather conditions. Thus, for example, the preferred embodiment of the invention finds the canopy enclosing a volume of about 39 cubic feet, whereas the transparent area of the plastic constituting the sheeting and covering of the framework will have an area of about 57 square feet. Generally, it will be preferred that the canopy encloses a volume in cubic feet which has a transparent area in square feet which is about 1.5 times the volume in cubic feet. This will enable a greenhouse effect to be achieved with the temperature within the canopy being raised by at least an amount of approximately 15 to 30 degrees Fahrenheit. It has been found specifically that the cabin within the canopy remains comfortably warm with a natural heat input of approximately 300 BTU's per hour, and this degree of heat input is readily achieved in accordance with the invention.

Figure 4:
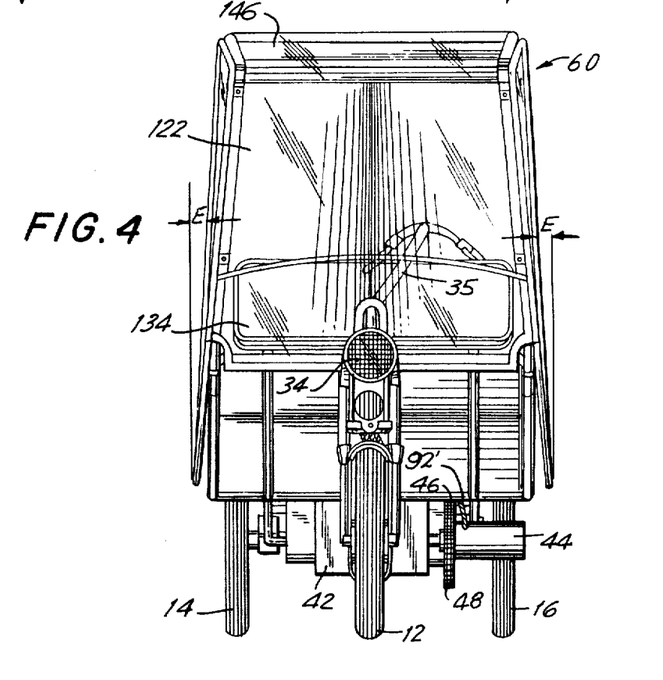
FIG. 4 is a front view of the vehicle of the invention.
Figure 5:
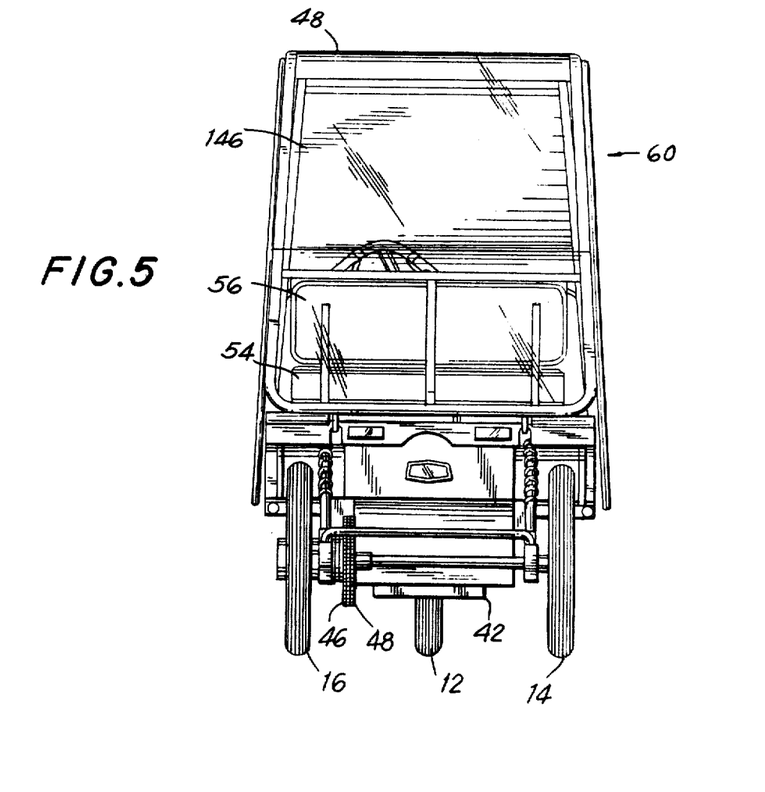
FIG. 5 is a rear view of the vehicle of the invention.
Figure 6:
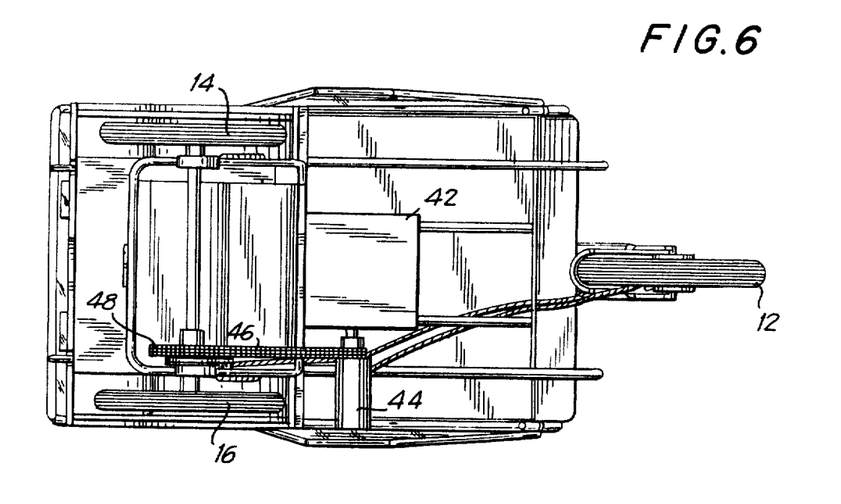
FIG. 6 is a bottom view of the vehicle of the invention.

As has been mentioned above and as is more readily seen with reference to FIG. 4, the sides of the vehicle are tapered inwardly by an angle generally indicated at E and varying according to construction from approximately four to ten degrees. This degree of deformation of the sides enables the sides to be placed under tension thereby holding taut the plastic sheeting covering the framework in the manner which has been described hereinabove. According to what has been stated above, the frame forming the canopy of the invention includes first and second connected planar sections, the first section being rearwardly inclined at an angle substantially greater than that of the second section which extends rearwardly above the aforesaid source of power and the center of gravity generally controlled thereby. This provides the generation of a vertical air resistance vector generally in the vicinity of the source of power and passing through or adjacent the center of gravities mentioned hereinabove. As may be noted from the aforegoing description, the second section is resiliently hinged to the first section, with the first section having an area of approximately 1,500 square inches ±10%, the second section having an area of about 850 square inches ±10%. The first section is the section X, whereas the second section is the section Y, all as mentioned in the aforegoing. The frame means moreover has a rear portion including third and fourth connected planar sections extending in sequence downwardly from the rearmost part of the second section, the fourth section being of a more vertical attitude than the third section. The area of the third section is preferably in the order of about 900 square inches ±10%, and the area of the fourth section is about 630 inches ±10%. It will be understood that according to the description given hereinabove, the sections form a jaw whereto are added the tusk-like members discussed previously in relation to to FIG. 11 (see members 164, 166, and 160, 162). The jaws are such as to resiliently resist outward deflection but permit such deflection as will enable the tusk-like members to be entered into tubes accommodating and holding the same. Thus, for purposes of assembly, the jaws are forced slightly open, and the tusk-like members are inserted into the accommodating tubes. Thereafter, the jaws are permitted to close under their own resilient forces, thereby locking the canopy detachably to the vehicle in a manner permitting ready removal. Such operation can be readily undertaken by persons without mechanical ability or without engineering know-how inasmuch as the canopy is itself relatively light in weight. Thus, for example, for the preferred design, wherein the vehicle has a weight of about 300 pounds and the source of power weighs about one third of the weight of the vehicle, the canopy will weigh in the order of approximately 26 pounds, thereby permitting the easy handling thereof and the assemblage of the same with the balance of the vehicle.

The canopy, with its relatively light weight, requires that it be formed of a relatively thin plastic. Such plastic may, as has been mentioned herein, be in the order of about 0.006–0.010 inches and will be fabricated, for example, of polyvinyl chloride or the like. The canopy includes detachable doors, which, along with the removability of the canopy or parts thereof, provide a fun-to-use vehicle, the doors of which are removable and the construction of which provides for great personal convenience. Aside from the great personal convenience and sporting aspects of the construction, there is also afforded relatively easy means of ventilation. The door sheeting, as mentioned hereinabove, can be folded downwardly over the struts 18 or removed in entirety. In the preferred case, it will be realized that provision is made for the opening of windows. The part 134 is readily removable, thereby providing for additional ventilation. There is thus provided a community with the outdoors and the sporting use of the vehicle of the invention is greatly enhanced by the wind resistance and the sensing of the whipping of the wind around the vehicle under the slow speeds which are employed deliberately according to further features of the invention.

It has been found that the wind resistance of the vehicle, aside from the utility mentioned hereinabove, is not a harmful factor at the speeds selected for the operation of the vehicle, notably, about 15–25 miles per hour. This speed is deliberately selected in this range so that the utilization of the vehicle in upwind and downwind directions is not significantly altered. This speed range avoids wind problems, and, to this end, a relatively low horsepower motor is employed, namely, within the range of from one-half to one horsepower, thereby deliberately achieving, in view of the weight and other dimensions of the vehicle construction, the desired speeds. If the vehicle were made heavier, it would be further confined as to speed and range and would not achieve the notable human engineering aspects of the design whereby a sporting and economic use are simultaneously obtained.

In a preferred construction, the wheel base of the vehicle preferably runs about 53 inches with an overall length of about 73 inches, whereas the tread width of the vehicle of the invention is approximately 31 inches with an overall width of about 36 inches. The length and width of the vehicle and their wind resistance characteristics creates stability with an efficient drive due to the angles of the windshield and other canopy sections, and, to the ends of achieving an effectively economical drive, the front wheel is selected and positioned to diverge the windstream about the battery pack, thereby to achieve an especially efficient utilization.

The seating for the passengers is arranged above the rear wheels and center of gravity, thereby adding to the vertical vector noted hereinabove with respect to wind resistance. The batteries are located preferably under the feet of the passengers and immediately forward of the axes of rotation of the rear wheels.

In addition to the features mentioned hereinabove, attention is directed to the fact that the doors detachably affixed to the canopy and hingeably accommodated thereon are provided with belts 202 and 204 as mentioned hereinabove relativel to FIG. 7. These belts are of sufficient length that the doors are permitted to flap open to a slight degree of three to five inches or to a greater degree if desirable. The belts 202 and 204 may be connected together by Velcro or may be knotted together at the free extremities thereof. The extremities attached to the door frame may be held on by Velcro or the like. The purpose of this arrangement is to minimize the effect of air resistance and wind on the operation of the device and to accommodate a movement of air within the cabin of the vehicle to an extent essential to promote the stability thereof. Accordingly, the belts 202 and 204 constitute an important feature of the invention.

The fact that the doors are permitted to open to a slight degree when the vehicle is in operation does not appear to hamper the self-heating feature of the invention whereby the heat of the body, which is supplied by the rate of 300 BTU's per hour, is capable of elevating the temperature within the cabin. This has been discussed above, but requires some additional comment in that the volume of the cabin is purposely made small so that in the conjunction with the relatively low speed of the vehicle and the shapes of the various canopy sections thereof as well as the areas of the same, in further conjunction with the verticality of the back and front, all operate to reduce any heat loss so that the canopy operates as a greenhouse to admit the influx of radiation while minimizing heat loss. The vehicle of the invention thereby compares favorably with streamline vehicles operating at a higher rate of speed wherein, without the supply of an external source of heat, the streamline type of vehicle becomes very uncomfortable during operation at relatively low temperatures.

There will now be obvious to those skilled in the art many modifications and variations of the structures and circuits set forth hereinabove. These modifications and variations will not depart from the scope of the invention if defined by the following.

What is claimed is:

1. A lightweight canopy for the sheltering of passengers in a vehicle, said canopy comprising spaced and parallel tubular frame parts of inverted generally U-shaped configuration, said frame parts including front and rear extremities, a transverse connecting member connecting the rear extremities of said parts, the U-shaped parts including bight portions resiliently deflectable towards each other, and at least one flexible cover portion mounted between said bight portions when the latter are deflected towards each other, and held under tension with the bight portions released and thereby tending to assume normal positions of rest.

2. A canopy as claimed in claim 1, wherein said parts include front and rear posts inclusive of said extremities comprising a transparent windshield extending between and connected to the front posts.

3. A canopy as claimed in claim 1 comprising horizontal tubes extending rearwardly from the extremities of the front posts to define door frames therewith and to provide that the front posts are resiliently deflectable towards each other.

4. A canopy as claimed in claim 3 comprising doors in said door frames, each said door including a generally polylateral tubular frame, and a flexible transparent sheet on and closing the polylateral frame.

5. A canopy as claimed in claim 4 comprising hinge means on the polylateral frames and hingeably coupling the same to said front posts.

6. A canopy as claimed in claim 5 comprising tusk-like members on said transverse connecting member and on said horizontal tubes for attaching the canopy to said vehicle.

7. A canopy as claimed in claim 5 comprising struts extending across said doors to embrace the transparent sheets thereof.

8. A canopy as claimed in claim 5 wherein said windshield has an upper edge, comprising first Velcro means on and extending along said upper edge, and second Velcro means on said cover portion for lockingly engaging said first Velcro means.

9. A canopy as claimed in claim 8 comprising a canopy apron positioned below said windshield and Velcro strips on said apron to hold the same removably on said front posts, said canopy apron being provided with a vertical downwardly open slot to accommodate a steering column of said vehicle.

10. A canopy as claimed in claim 7, wherein said struts are positioned approximately midway relative to the height of the door and the transparent sheets are foldable over the struts to form window openings.

* * * * *